(12) United States Patent
Garms (10) Patent No.: US 8,260,020 B2
(45) Date of Patent: Sep. 4, 2012

(54) IMAGE BASED COMPUTED TOMOGRAPHY NUMBER AND VOLUME CORRECTIONS FOR THIN OBJECTS IN COMPUTED TOMOGRAPHY SYSTEMS

(75) Inventor: Walter Garms, Berkeley, CA (US)

(73) Assignee: Morpho Detection, Inc., Newark, CA (US)

( * ) Notice: Subject to any disclaimer, the term of this patent is extended or adjusted under 35 U.S.C. 154(b) by 1124 days.

(21) Appl. No.: 12/130,269

(22) Filed: May 30, 2008

(65) Prior Publication Data

US 2009/0169081 A1 Jul. 2, 2009

Related U.S. Application Data

(63) Continuation-in-part of application No. 11/967,507, filed on Dec. 31, 2007, now abandoned.

(51) Int. Cl.
 *G06K 9/00* (2006.01)
(52) U.S. Cl. ............ 382/131; 382/128; 382/195
(58) Field of Classification Search ............ 382/128, 382/131, 132; 378/4, 15, 19, 62, 5
See application file for complete search history.

(56) References Cited

U.S. PATENT DOCUMENTS

| | | | |
|---|---|---|---|
| 5,712,926 A | 1/1998 | Eberhard et al. |
| 5,905,806 A | 5/1999 | Eberhard et al. |
| 6,026,143 A | 2/2000 | Simanovsky et al. |
| 6,035,014 A | 3/2000 | Hiraoglu et al. |
| 6,067,366 A | 5/2000 | Simanovsky et al. |
| 6,075,871 A | 6/2000 | Simanovsky et al. |
| 6,076,400 A | 6/2000 | Bechwati et al. |
| 6,078,642 A | 6/2000 | Simanovsky et al. |
| 6,108,396 A | 8/2000 | Bechwati et al. |
| 6,111,974 A | 8/2000 | Hiraoglu et al. |
| 6,128,365 A | 10/2000 | Bechwati et al. |
| 6,195,444 B1 | 2/2001 | Simanovsky et al. |
| 6,272,230 B1 | 8/2001 | Hiraoglu et al. |
| 6,317,509 B1 | 11/2001 | Simanovsky et al. |
| 6,345,113 B1 | 2/2002 | Crawford et al. |
| 7,277,577 B2 | 10/2007 | Ying et al. |
| 7,302,083 B2 | 11/2007 | Larson et al. |

(Continued)

FOREIGN PATENT DOCUMENTS

WO 00/42566 7/2000

(Continued)

OTHER PUBLICATIONS

Notice of Allowance for U.S. Appl. No. 11/967,507 mailed Oct. 11, 2011, 13 pages.

(Continued)

*Primary Examiner* — Chan S Park
*Assistant Examiner* — Nancy Bitar
(74) *Attorney, Agent, or Firm* — Armstrong Teasdale LLP (57) ABSTRACT

Methods, apparatuses, and computer-readable media are provided for image based CT Number and volume corrections for thin objects in computed tomography systems. For example, in one embodiment a method is provide which computes an average computed tomography ("CT") value and volume of voxels that are part of an object. Thereafter, a surface area and a surface CT Number, a boundary area and a boundary CT Number, and a corrected CT Number and a corrected volume for the object are computed. Embodiments of the invention also include other methods, computer-readable mediums, apparatuses, and systems that contain features similar to the features in the above described method.

6 Claims, 11 Drawing Sheets

U.S. PATENT DOCUMENTS

| | | | |
|---|---|---|---|
| 2004/0264625 A1* | 12/2004 | Basu et al. | 378/4 |
| 2005/0180541 A1* | 8/2005 | Avinash et al. | 378/5 |
| 2005/0249416 A1* | 11/2005 | Leue et al. | 382/195 |
| 2007/0014471 A1 | 1/2007 | Simanovsky et al. | |
| 2007/0014472 A1 | 1/2007 | Ying et al. | |
| 2007/0031036 A1 | 2/2007 | Naidu et al. | |
| 2009/0074129 A1* | 3/2009 | Kohler et al. | 378/4 |
| 2009/0169079 A1* | 7/2009 | Garms | 382/131 |
| 2010/0061610 A1 | 3/2010 | Van De Haar | |

FOREIGN PATENT DOCUMENTS

| | | |
|---|---|---|
| WO | 00/42567 | 7/2000 |

OTHER PUBLICATIONS

Office Action for U.S. Appl. No. 11/967,507 dated Jun. 14, 2011, 8 pages.

* cited by examiner

IMAGE BASED COMPUTED TOMOGRAPHY NUMBER AND VOLUME CORRECTIONS FOR THIN OBJECTS IN COMPUTED TOMOGRAPHY SYSTEMS

CROSS-REFERENCE TO RELATED APPLICATIONS

This application is a continuation-in-part of U.S. patent application Ser. No. 11/967,507, filed Dec. 31, 2007 now abandoned, which is incorporated by reference herein.

BACKGROUND

1. Field of the Invention

Embodiments of the present invention generally relate to analysis of Computed Tomography ("CT") images, and particularly to CT systems used for detection of explosives.

2. Description of the Related Art

Some baggage inspection systems utilize transmission x-ray images at one or more angles. In some known computed tomography ("CT") imaging system configurations, an X-ray source projects a fan-shaped or a cone-shaped beam, which is collimated to hit a linear or two-dimensional array of detectors. The X-ray beam passes through an object being imaged. The beam, after being attenuated by the object, impinges upon an array of radiation detectors. Each detector element of the array produces a separate electrical signal that is a measurement of the beam intensity at the detector location. During data acquisition, a gantry rotates around a tunnel with an X-ray emitter.

Some explosive detection systems utilize CT technology to produce CT images that represent a cross section, or slice, through the object. A CT image consists of an array of pixels. Each pixel has a value representing the x-ray attenuation of the image object at that point in the image. X-ray attenuation can be used as an approximation of density. Pixel values in a CT image are referred to as "CT Numbers" and are often in Hounsfield units.

Some CT based systems use a transmission image plus a limited number of CT slices to determine the density and volume of objects. These systems are referred to as "sparse slicing systems". In some cases, the transmission image is acquired using a tube and detector assembly mounted on a rotating gantry. The gantry rotates around the object while the object passes through the gantry, producing a twisted transmission image.

In other CT based systems, CT slices are produced at regular, closely spaced intervals so that the entire volume of an object is imaged. These scanners are referred to as volume scanners. Each pixel in each CT slice therefore represents a volume, and is often called a voxel. The value of each voxel represents an approximation of the density of the object within the voxel. Each voxel represents X-ray attenuation and is related to object density and effective atomic number. Many volume scanners employ multiple rows of detectors arranged in an array, and an object is moved continuously through the gantry while the gantry rotates. These scanners are called spiral or helical scanners.

CT scanners can accurately produce CT numbers for large objects. However, as objects become smaller or thinner, the accuracy of the CT number decreases. The accuracy of the CT number is limited by the spatial resolution of the scanner. The spatial resolution of the scanner is determined by the size of the x-ray source, the size of the detectors, the number of views acquired, and convolution filters used in CT image reconstruction. For helical scanners, the pitch of the scanner also influences the resolution. Pitch is the speed that the object moves through the scanner in relation to the rotational speed of the gantry and the width of the detector array.

CT number accuracy is further limited by the size of the pixel or voxel. If the pixel is large compared to the object being imaged and the object covers only half the area of the pixel, the CT number will represent the average linear attenuation of the object and the surrounding material. Furthermore, because of the nonlinear nature of CT transmission (as opposed to, e.g., emission tomography), the CT number for voxels that contain mixtures of materials is a nonlinear function of the total attenuation, a phenomenon known as Nonlinear Partial Volume.

Some approaches in the prior art (e.g., U.S. Pat. No. 6,026,143 issued Feb. 15, 2000) utilize erosion of the exterior surface of an object as a way of discovering the true CT number of the object. If the object is surrounded by low density material, such as air, the voxels on the exterior surface will be lower than the interior voxels. Erosion is an image processing technique for removing the exterior voxels from an object. Once the surface is eroded, the remaining voxels have a CT number that is closer to the true CT number of the object. After the interior CT number is known, the object is dilated, or the eroded pixels are added back into the object, but the CT number of the previously eroded pixels is changed to be equal to the interior CT number. The problem with this approach is that as the thickness of an object approaches the spatial resolution of the CT system, the interior pixels no longer reflect the true CT number of the object. In the prior art, voxels are identified as belonging to sheet objects, bulk objects, or background. Then objects are built from connected voxels of the same type to form sheet or bulk objects. Thereafter, sheet objects and bulk objects are treated differently, including using different density and mass thresholds to determine whether an object is benign or is a threat. The problem with this approach is that both bulk and sheet explosives can be made of the same material, and it is easily possible to form a single object from plastic explosives that is thin in parts and thick in other parts, and thereby appearing to be part sheet and part bulk. This could cause misclassification of the object and also could cause a single object to be segmented into separate pieces, each of which is too small to cause an alarm.

Therefore, there is a need in the art for improved detection and analysis of thin objects in CT systems.

SUMMARY

Methods, apparatuses, and computer-readable media are provided for image based computed tomography ("CT") number and volume corrections for thin objects in computed tomography systems by measuring characteristics of the surface of the objects and applying mathematical corrections based on these characteristics. The characteristics include surface area, volume, and edge gradient.

For example, in one embodiment, a method is provide which computes an average CT value and volume of voxels that are part of an object. Thereafter, a surface area and a surface CT Number, a boundary area and a boundary CT Number, and a corrected CT Number and a corrected volume for the object are computed. Embodiments of the invention also include other methods, computer-readable media, apparatuses, and systems that contain features similar to the features in the above described method.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

In the following description, numerous specific details are set forth to provide a more thorough understanding of the invention. As will be apparent to those skilled in the art, however, various changes using different configurations may be made without departing from the scope of the invention. In other instances, well-known features have not been described in order to avoid obscuring the invention. Thus, the invention is not considered limited to the particular illustrative embodiments shown in the specification and all such alternate embodiments are intended to be included in the scope of the appended claims.

One of the technical effects disclosed herein is an improved detection and analysis of thin objects in computed tomography ("CT") systems.

Aspects of the invention are described herein as utilizing an X-ray emitter/detector array combination that rotates. However, it is appreciated that aspects of the invention can be used with scanners that have a stationary X-ray emitter and/or detector array.

Figure 1:
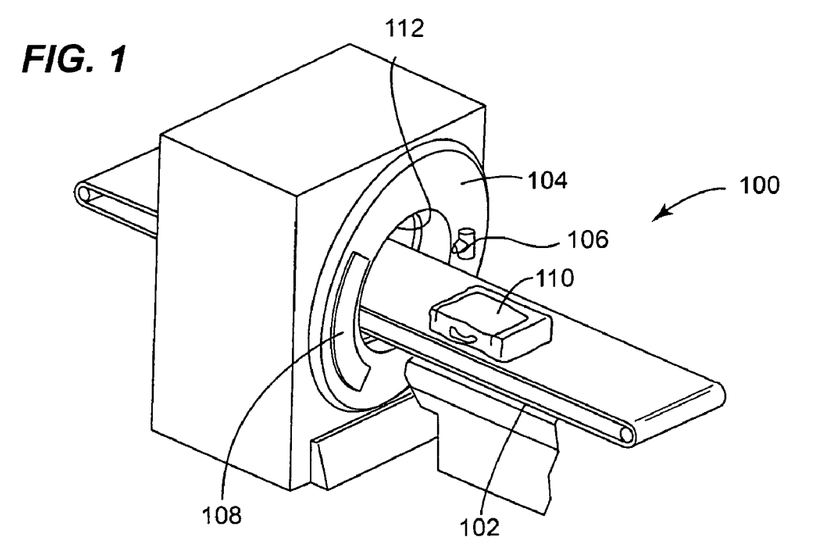
FIG. 1 is a perspective view of an exemplary gantry/conveyor combination in accordance with aspects of this disclosure.

FIG. 1 is a perspective view of a gantry/conveyor combination 100. The gantry/conveyor combination 100 includes a conveyor 102 and gantry 104. The gantry 104 includes an emitter 106 (e.g., an X-ray emitter), a detector array 108, and a gantry tunnel 112. In operation, the conveyor 102 moves such that when an item (e.g., item 110) is placed on conveyor 102, the conveyor 102 moves the item towards; through; and past the gantry 104 and gantry tunnel 112.

The X-ray emitter 106 and the detector array 108 are rotated with the gantry 104 within the imaging plane and around the item(s) to be imaged such that the angle at which an X-ray beam intersects the item 110 constantly changes (hereinafter each change is referred to as "a view"). As the item 110 passes through the gantry 104, the gantry gathers x-ray intensity data (hereafter referred to as "raw data") acquired from detectors in the detector array 108 for each view.

For exemplary purposes only, each view is about 0.25 degrees from an immediately preceding view and about 0.25 degrees from an immediately subsequent view. Thus (in this example), for a full gantry rotation there can be about 1440 views. The set of raw data views is called a "sinogram." It is appreciated however, that more views can be acquired (i.e., each view is less than 0.25 degrees apart) and utilized in accordance with this disclosure. Similarly, fewer views can be acquired at a larger separation and similarly utilized as described in this disclosure.

Figure 2:
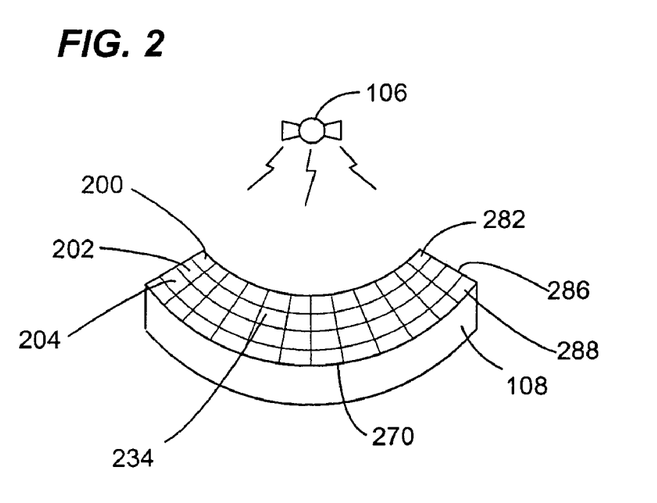
FIG. 2 depicts a perspective view of an exemplary emitter and detector array combination in accordance with aspects of this disclosure.

FIG. 2 depicts a perspective view of an embodiment of the emitter 106 and detector array 108. Typically, the emitter 106 emits X-rays that the detector array 108 is designed to detect. The operating principles of the emitter 106 and detector array 108 combination is known and will not be discussed in detail. The detector array 108 has a plurality of detectors (e.g., thousands of detectors). For simplicity, the detector array 108 is described utilizing a few of the detectors (i.e., detectors 200, 202, 204, 234, 270, 282, 286, and 288) in the detector array 108.

Figure 3:
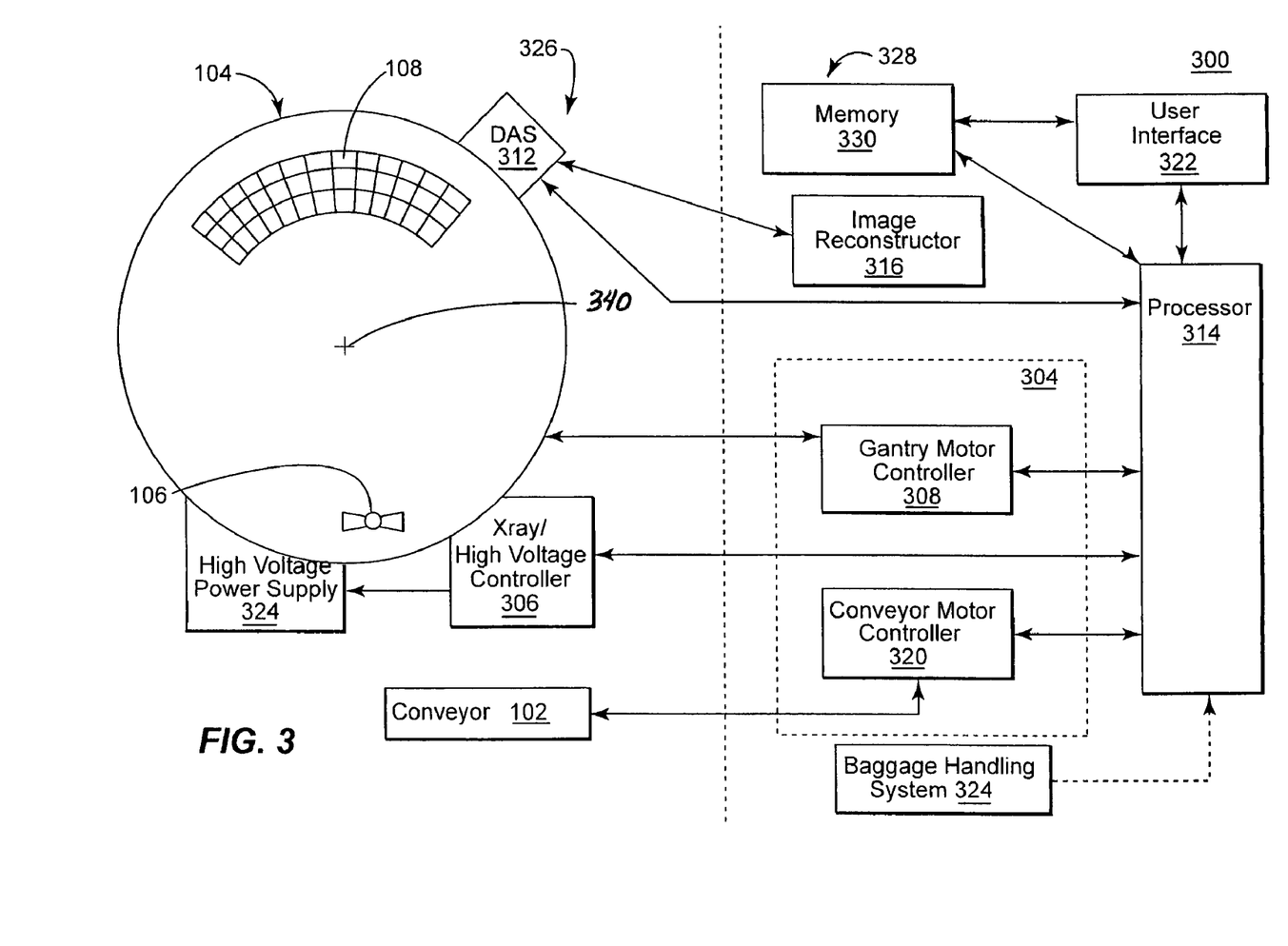
FIG. 3 depicts an embodiment of a block diagram of a system in accordance with aspects of this disclosure.

FIG. 3 depicts an embodiment of a block diagram of a system 300 used in accordance with aspects of the invention. For clarity, System 300 is separated into moving components 326 and stationary components 328.

The moving components 326 include the gantry 104, conveyor 102, an X-ray/high voltage controller 306, a data acquisition system ("DAS") 312, and a high voltage power supply. The DAS 312, X-ray/high voltage controller 306, and high voltage power supply 324 are secured to (and rotate in unison with) the gantry 104.

The stationary components 328 include a control mechanism 304, a processor 314, a user interface 322, memory 330, an image reconstruction subsystem 316, and a baggage handling system 324. The control mechanism 304 includes a gantry motor controller 308 and a conveyor motor controller 320.

The gantry 104 includes the emitter 106 and the detector array 108. Each detector (e.g., detectors 200, 202, 204, 234, 270, 282, 286, and 288), shown in FIG. 2, in the detector array 108 produces an electrical signal that represents the intensity of an impinging X-ray beam and hence allows estimation of the attenuation of the beam as it passes through item 110. During a scan to acquire X-ray projection data, gantry 104 and the components mounted thereon rotate about a center of rotation 340.

Rotation of the gantry 104, the operation of X-ray emitter 106, and movement of the conveyor 102 are governed by the control mechanism 304. Although not depicted in FIG. 3, the control mechanism 304 includes an X-ray controller 306 that provides power to X-ray source 106, a gantry motor controller 308 that controls the rotational speed and position of gantry 104, a conveyor motor controller 320 and a data acquisition system ("DAS") 312. The rotating gantry includes an X-Ray power supply (not shown), controller 306, and the DAS 312. The remaining components are stationary (e.g., gantry motor controller 308, processor 304, and image reconstructor 316, etc.). Although the image reconstructor 316 and processor 314 are depicted, in FIG. 3, as separate components that depiction is for illustrative purposes only. It is appreciated that in various embodiments, the image reconstructor 316 may be part of the processor 314 (i.e., a single unit).

The DAS 312 samples analog data from detector array 108 and converts the data to digital signals for subsequent processing. For example, when the item (e.g., item 110) is placed on the conveyor 102, the digital signals produced when the item is scanned are raw data.

The image reconstructor 316 receives sampled and digitized X-ray data from DAS 312 and performs high-speed image reconstruction. The reconstructed image is applied as an input to the processor 314, which stores the image in memory 330. After the image is reconstructed the image is analyzed to determine whether the image contains contraband (e.g., explosives, drugs, weapons, etc.).

Processor 314 may also receive commands and scanning parameters from an operator (not shown) via the user interface 322 (e.g., a cathode ray tube, a keyboard, a mouse, and/or like device).

The operator can supply commands and parameters via the user interface 322 to instruct the processor 314 to provide control signals and information to the DAS 312, the X-ray controller 306, the gantry motor controller 308, and/or the conveyor motor controller 320.

Figure 4:
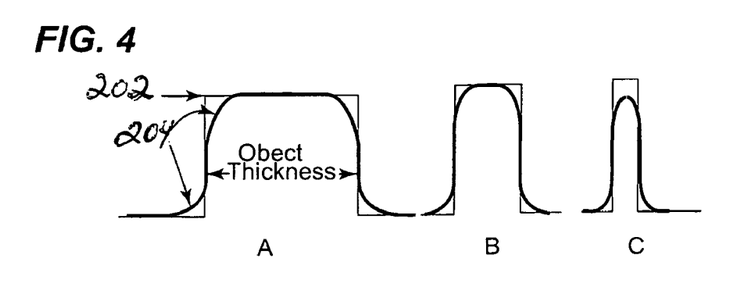
FIG. 4 depicts a CT number profile in accordance with aspects of this disclosure.

FIG. 4 depicts a CT number profile of a line passing through a CT image. Specifically, FIG. 4 depicts 3 portions labeled "A," "B," and "C." The line crosses three objects "A," "B," and "C" that are represented in the CT image. "A," "B," and "C" are objects of different thicknesses, "A" being the thickest and "C" the thinnest. In portion "A" of FIG. 4, the object is thick compared to the spatial resolution of the CT system. Line 202 shows the theoretically correct CT number (i.e., the CT number when there are no imaging errors). Line 204 depicts an embodiment of actual measured CT number in the image. The CT number near the edges of the object is averaged between the air and the object, so the edge appears blurred. In the interior of the object the CT number is equal to the theoretical CT number. The average CT number of all of the pixels in the object is slightly less than the theoretical correct CT number.

In portion "B" of FIG. 4, the object is close to the spatial resolution of the imaging system. At the very center, the CT number is correct, but all other points are less than the theoretical CT number.

In portion "C" of FIG. 4, an object is depicted that is thinner than the spatial resolution of the scanner. Here the averaging of the edges extends to the center, so that all of the CT numbers in the object are less than the theoretically correct CT number.

The measured volume of an object is also affected by the spatial resolution of the CT system and the voxel size. Objects are formed from a CT volume by connecting adjacent pixels/voxels when the CT number of the pixel/voxel falls within a threshold; or when it is close in value to the adjacent pixel/voxel. Depending on the value of the threshold the volume of a single object may be under or over estimated. A lower threshold produces a larger volume and a higher threshold produces a smaller volume. However, the threshold must be high enough that distinct objects that are close together are not improperly joined together, and therefore the volume is often underestimated. This effect is more pronounced as objects become thinner.

Figure 5:
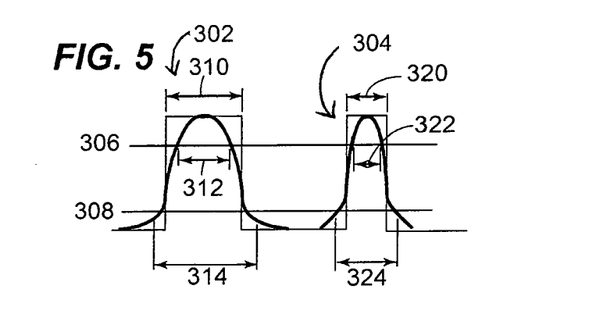
FIG. 5 depicts the measured cross section of exemplary multiple objects in accordance with aspects of this disclosure.

FIG. 5 depicts the measured cross section of two objects 302 and 304 that are affected by the choice of the CT number threshold for joining pixels. The correct width for 302 is 310; and the correct width for 304 is 320. At the higher threshold 306, the measured width 310 of object 302 is smaller (shown at 312) than the true value. For a lower threshold 308, the measured width 310 of the same object 302 is larger (shown a 314) than the true value. Similarly for the higher threshold 306, the width of object 304 is 322, and at the lower threshold the width is 324. For the higher threshold 306, the error in width 304 (about 320 to about 322) is greater in proportion to the width than the error for object 302 (i.e., [(320−322)/320] is greater than [(310−312)/310]).

Figure 6:
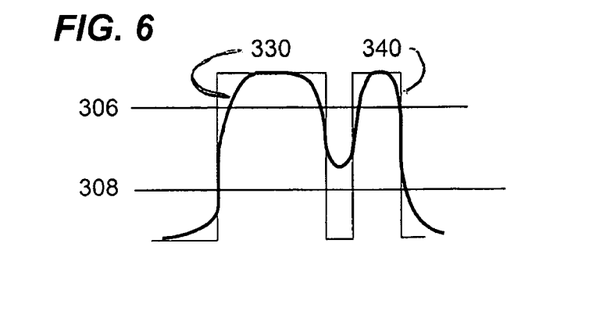
FIG. 6 depicts the use of a lower threshold incorrectly joining two separate objects of FIG. 5.

FIG. 6 depicts the use of a lower threshold incorrectly joining two separate objects. Here two objects 330 and 340 are close together. At the higher threshold 306 the two objects are correctly found to be separate objects. But at the lower threshold 308 the two objects are incorrectly found to be part of one larger object.

Figure 7:
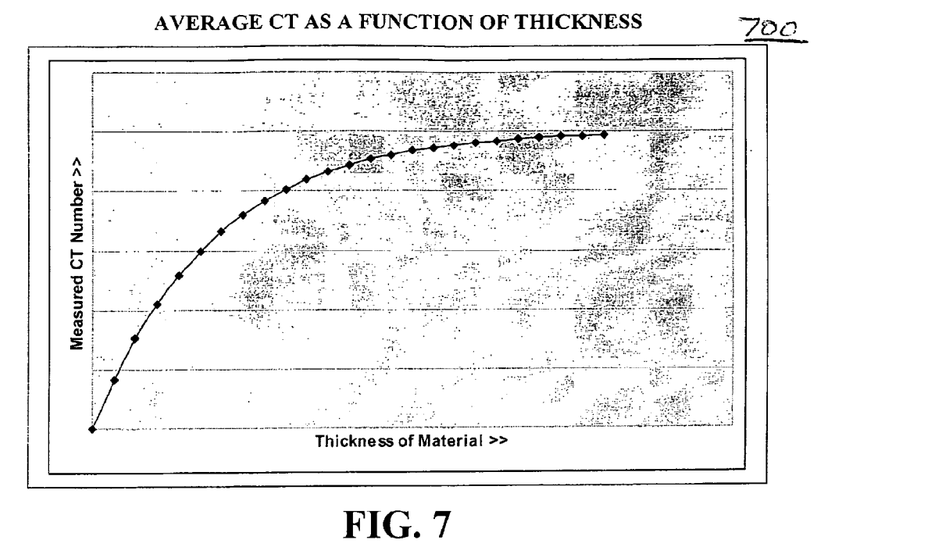
FIG. 7 depicts the measured CT number of a sheet like object as a function of the thickness of the sheet.

FIG. 7 depicts the average measured CT number of the voxels in a sheet like object as a function of the thickness of the sheet. The CT number is constant for thicker values, but as the thickness decreases past a certain point the CT numbers drop off. The CT number approaches zero as the thickness approaches zero.

Figure 8:
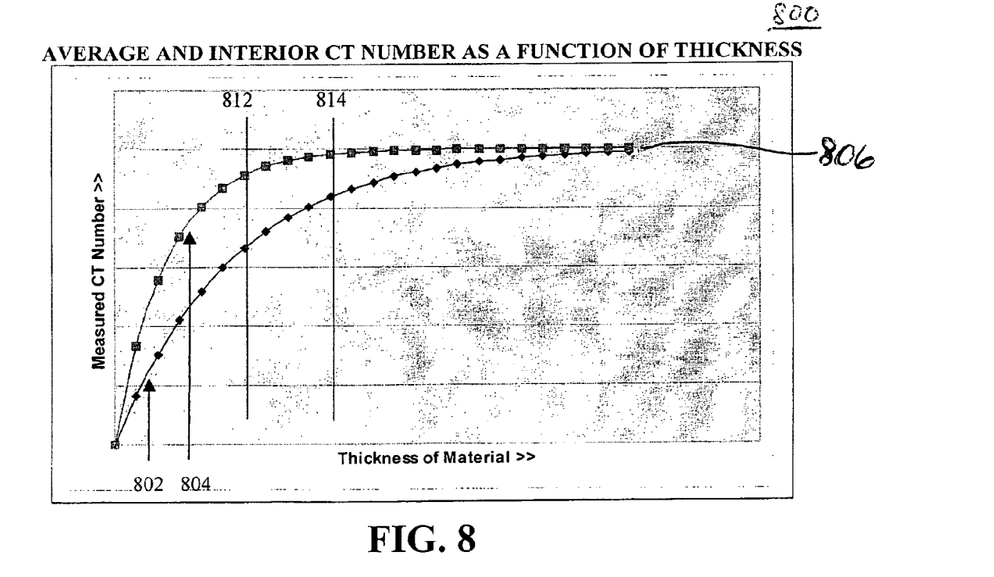
FIG. 8 depicts an illustrative chart of the CT number of the interior, non-eroded voxels, and the average CT number of all of the voxels in an object as the thickness of the object approaches zero.

FIG. 8 depicts the average measured CT number of all of the voxels in a sheet-like object as the thickness decreases 802; and the measured CT number of the interior, non-eroded voxels 804. The correct CT value is depicted at 806.

For thicknesses greater than 814, the interior pixels 804 remain close to the correct value even though the average CT number has already started to decrease. However, the interior CT number also begins to decrease for sheet thickness less than 812. For this reason the prior art is not capable of determining the true CT number of thinner objects.

The distance over which the edges are blurred is slightly longer for dense objects than for less dense objects, but for a first order approximation the blurring distance is roughly constant. Therefore, the steepness of the edges for thick objects will change with the CT number of the object. For denser objects of the same dimension, the edge will be steeper than less dense objects.

Figure 9:
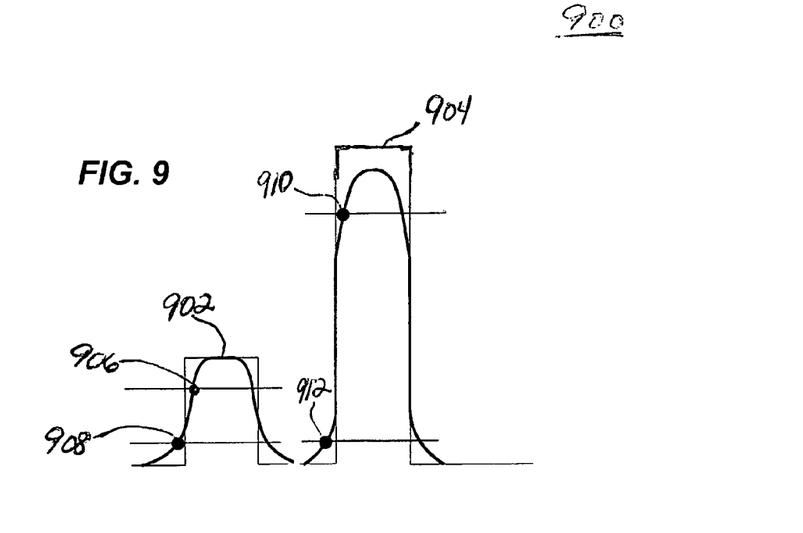
FIG. 9 depicts an illustrative plot of CT numbers across multiple objects of different densities in accordance with aspects of this disclosure.

FIG. 9 depicts a plot of CT numbers across two objects of different densities and illustrates the steepness of the edge profile. The less dense object is 902 and the denser object is 904. On object 902 are two points: one point 906 (inside the object) and a second point 908 (outside the object) are selected. The difference between the CT numbers for points 906 and 908 represents the steepness of the edge.

On object 904 two similar points 910 and 912. Point 910 is just inside of object 904 and point 912 is just outside of object 904. The points (i.e., points 906, 908, 910, and 912) are chosen such that the physical distance (along the x-axis) between 910 and 912 is substantially the same as the distance between points 906 and 908. However, the height difference (i.e., along the y-axis and is the difference measured CT number) between 906 and 908 is much smaller than the difference between 910 and 912. The slope of the edges of the lower density object 902 is much smaller than the slope of the edges of object 904. The edge slope, therefore, can be used as a predictor of the CT number of the object.

Figure 10:
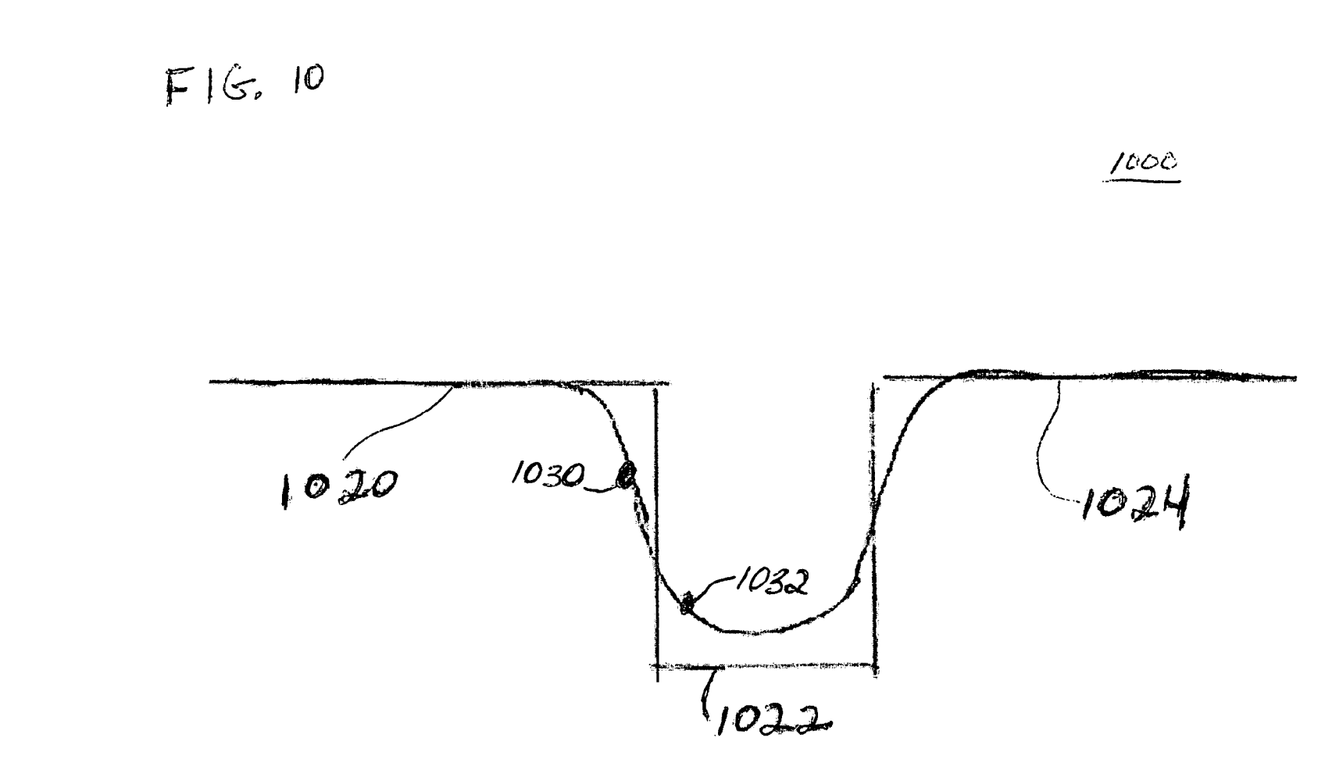
FIG. 10 depicts an illustrative plot of CT numbers across multiple objects in accordance with aspects of this disclosure.

FIG. 10 depicts a plot of CT numbers across three objects 1020, 1022, and 1024. Object 1022 is surrounded by two denser objects 1020 and 1024. For object 1022, the measured CT is on average higher than the correct CT number for this object.

In FIG. 10, two points are also chosen. Point 1030 is just outside of object 1022 and point 1032 is just inside object 1022. Point 1030 has a higher measured CT number than point 1032. Similar to FIG. 9, in FIG. 10 the difference between point 1030 and 1032 is a predictor of the true CT number of the object (in FIG. 10, object 1022).

Figure 11:
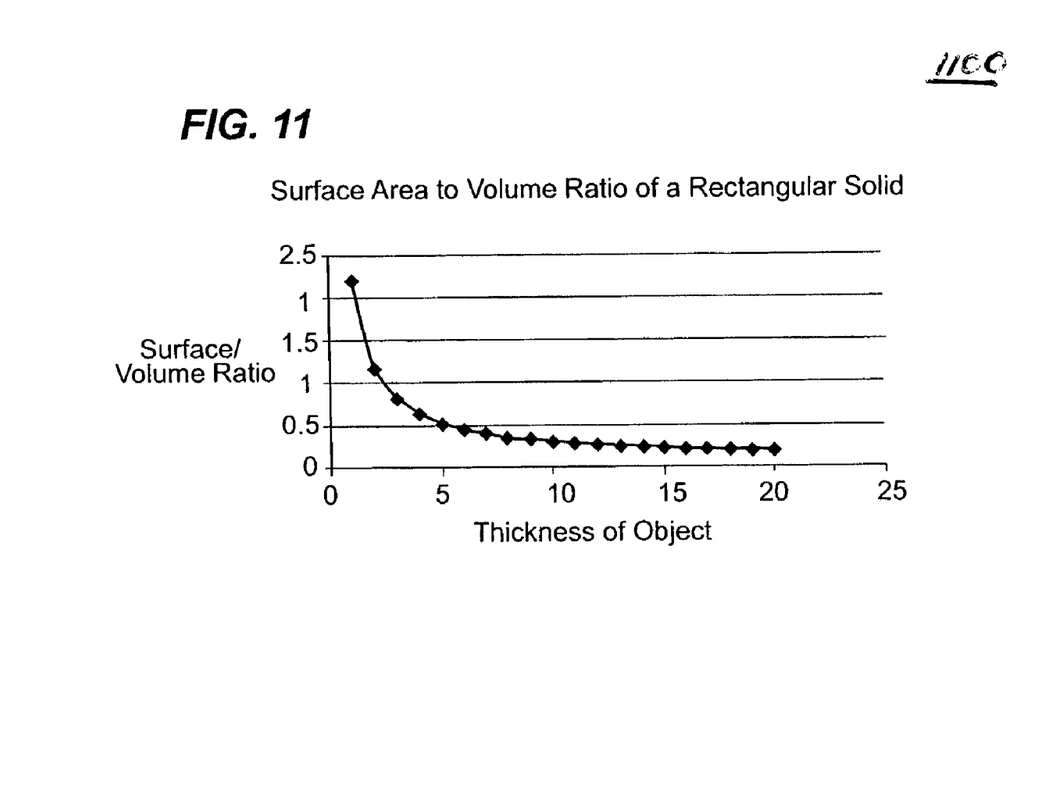
FIG. 11 depicts the ratio of surface area to volume as the thickness of an object decreases in accordance with aspects of this disclosure.

FIG. 11 depicts the ratio of surface area to volume as the thickness of an object decreases. For example, the quantity (surface area)/(volume) is plotted for a rectangular solid with dimensions 20×20×T, with T varying from 1 to 20 units. A Comparison of FIG. 11 to FIG. 7 indicates that the ratio of surface area to volume is roughly proportional to the error in CT number as the thickness of an object decreases.

As FIGS. 9 and 10 depict, the difference between the boundary voxels (the voxels adjacent to but outside the object) and the surface voxels (i.e., the voxels inside the object and adjacent to the boundary) indicate the direction and magnitude of the CT number error near the surface of the object.

FIGS. 7 and 8 depict that the CT number error for the entire object increases in a non-linear manner as the object thickness decreases. FIG. 11 shows that the surface area to volume ratio also increases in a non-linear manner as thickness decreases. Taken together, it is possible to form an equation that predicts the true CT number of the object without computing the thickness:

$$\text{True } CT\# = AvgCT + A1*SR*ES \quad \text{Equation (1)}$$

Where AvgCT=The average measured CT number of the voxels in the object; SR=Ratio of surface area to volume; ES=Edge Slope=<average CT# of surface voxels>−<average CT# of boundary Voxels>; and A1 is an experimentally or theoretically derived coefficient.

$$ES \text{ (EdgeSlope)} = (\text{avg of surface}) - (\text{average of boundary}) \quad \text{Equation (2)}$$

Other more complex formulae may be derived such as a $2^{nd}$ order polynomial provided in Equation (3) below:

$$\text{True } CT\# = AvgCT + A0*SR + A1*SR*ES + A2*SR^2*ES \quad \text{Equation (3)}$$

Another formula, a second order 2-dimensional polynomial can also be used and is provided by Equation (4) below:

$$\text{True} CT\# = AvgCT + A0*SR + A1*SR*ES + A2*SR^2*ES + A3*SR*ES^2 + A4*SR^2*ES^2 \quad \text{Equation (4)}$$

Where A0, A1, A2, A3, and A4 are experimentally or theoretically derived coefficients.

Similarly, a formula for the true volume of the object can be formed that is valid regardless of the thickness of the object, for example Equation (5) is provided below:

$$\text{True Volume} = \text{Measured Volume} + B1*SR + B2*SR*ES \quad \text{Equation (5)}$$

The coefficients A1, ... An and B0 ... Bn are dependent on the spatial resolution and pixel size of the CT system that is used to generate the images, and also dependent on the algorithm and thresholds used to segment the voxels into contiguous objects.

The coefficients can be derived experimentally by imaging a set of objects of known density and volume. The various quantities (e.g., volume, CT Number, surface area, and edge slope) are measured. Least square fitting techniques can be used to compute the coefficients for the formula that is used.

In various embodiments, various methods (e.g., erosion and dilation operators) are used to find the surface and boundary voxels of a three-dimensional object. For example, when an objected is eroded by one voxel, the voxels that were eroded represent the surface of the object. When an object is dilated by one voxel, the voxels that were added are the boundary of the original object.

Figure 12:
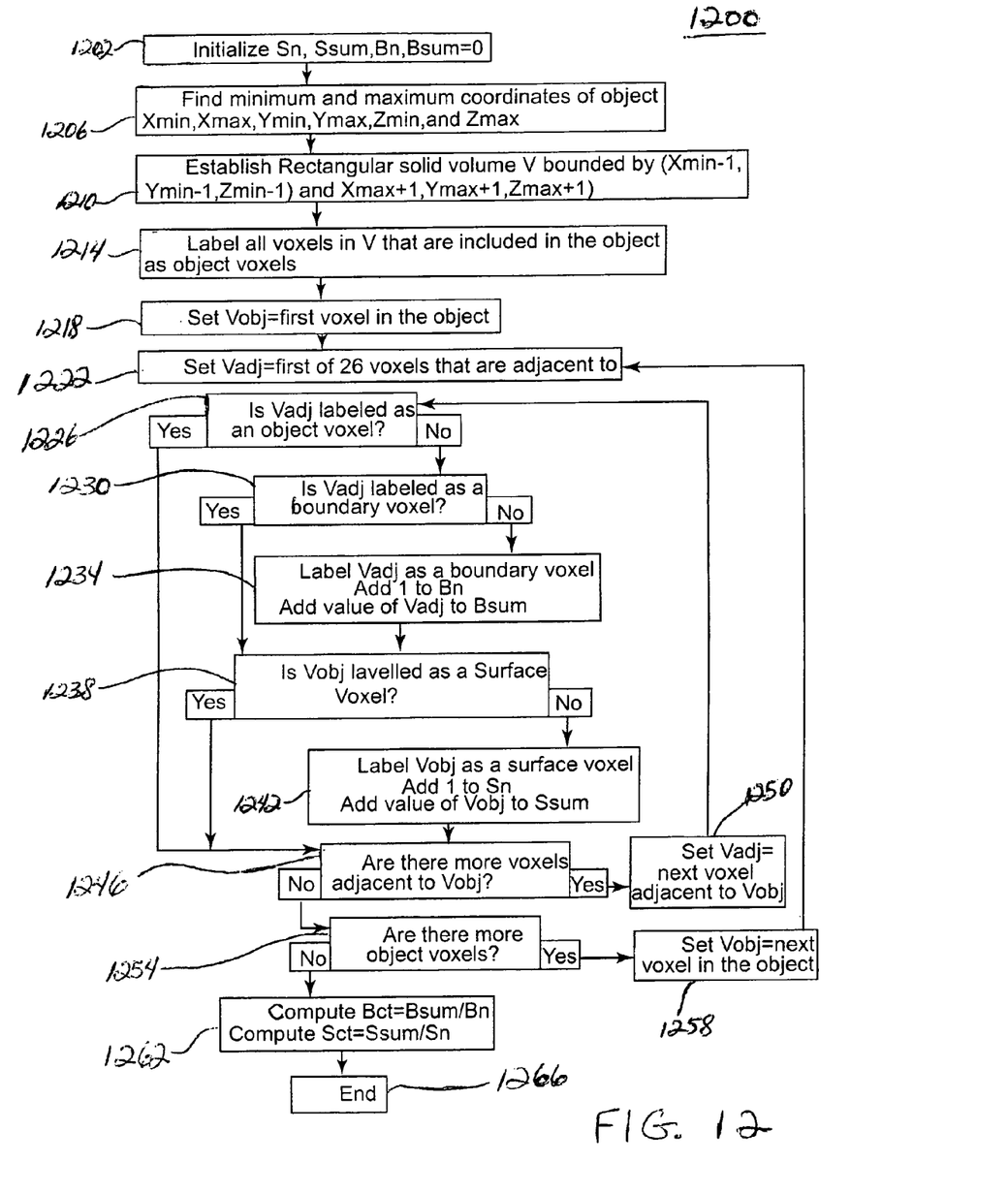
FIG. 12 depicts an embodiment of a flowchart of an algorithm in accordance with aspects of the disclosure.

FIG. 12 depicts an embodiment of a flowchart 1200 of an algorithm in accordance with aspects of the disclosure.

For some CT systems, the spatial resolution is not the same in all three axes. For example, if the X.Y plane is parallel to the plane of rotation, and the Z axis is parallel to the direction of bag movement, then the resolution in the X and Y directions generally the same but the resolution in the Z direction is often different. In this case the errors in CT number and volume are different depending on the orientation of the object. Generally, sparse slicing explosive detection systems do not create full volume data, and it is therefore it is difficult to find the entire 3-dimensional surface of an object using these detection systems.

For both of these situations an accurate correction for CT number and volume can still be computed by decomposing an object into a set of planes corresponding to each CT slice that is acquired over the length (in Z) of the object. For each CT plane there will one or more 2-dimensional regions (CT Regions) that correspond to the cross section of the object. A 2-dimensional correction method (similar to the one described for 3-D objects) is performed on each region. Then a final correction is applied in the Z direction.

The average CT number of each CT Region is affected by the thickness of CT region. The error in CT number of the 2-dimensional region is quite similar to the error in CT number of a 3-Dimensional object previously described and as depicted in FIGS. 7 and 8. As the thickness of the region decreases, the average CT number of the region decreases in a non-linear manner.

Figure 13:
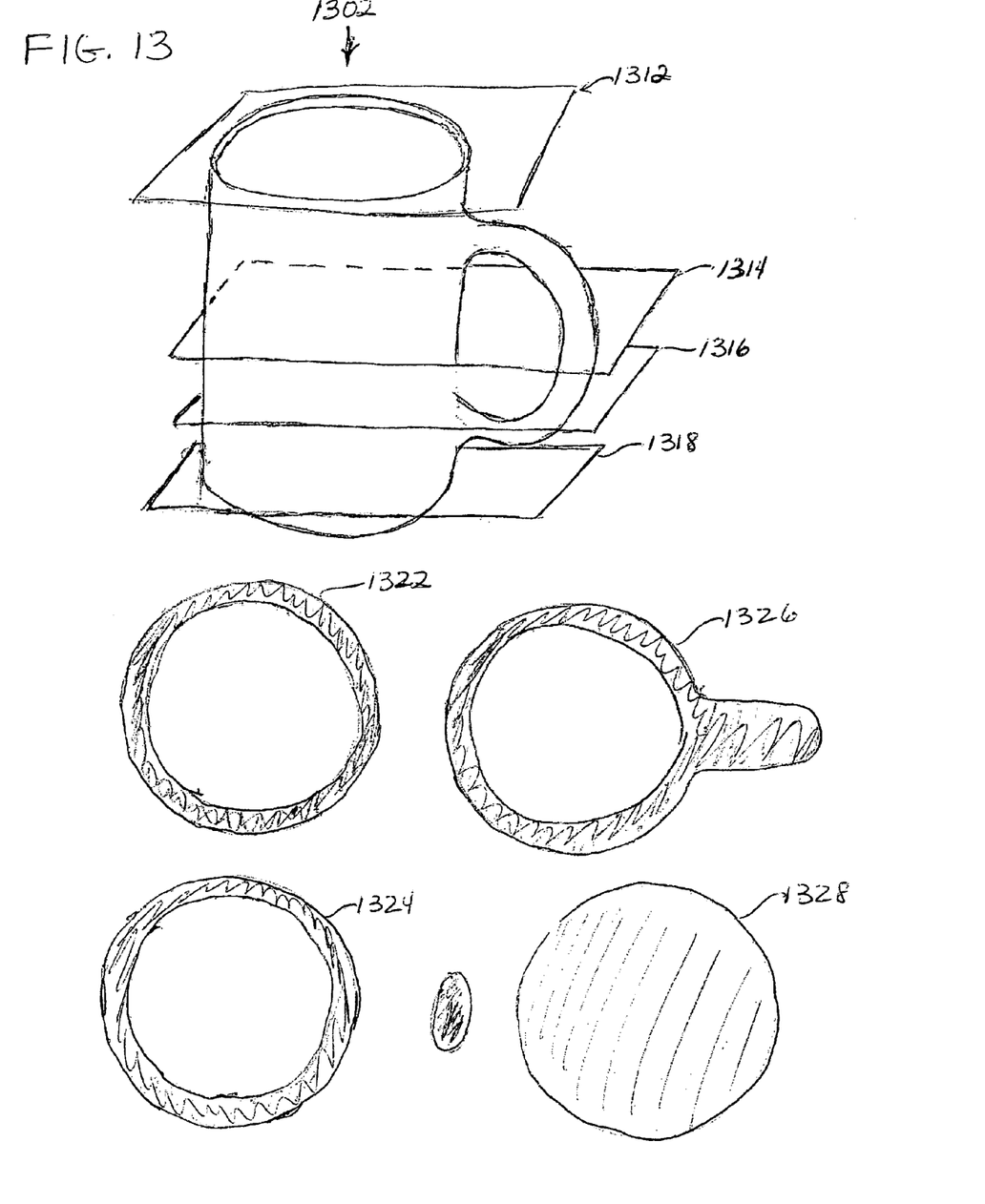
FIG. 13 depicts a high-level block diagram of a general-purpose computer architecture 1300 for performing an embodiment of the invention.

FIG. 13 depicts a coffee cup 1302 with four CT slices through it at locations 1312, 1314, 1316, and 1318. These create the four corresponding cross sections 1322, 1324, 1326, and 1328. These cross sections can be segmented to create CT regions. Slices 1312, 1316, and 1318 will have one CT region associated with the object, and slice 1324 has two (one for the cup and one for the handle). The CT regions corresponding to the open cup (1312, 1314, and 1316) will be annular in shape, and the slice through the base of the cup (1318) will create a region 1328 that is circular.

For a 2-dimensional region the area and the length of the perimeter of the region can be computed, and the ratio of perimeter to area increases in a non-linear manner as the thickness of the region decreases. The ratio of perimeter to area as a function of thickness follows the same inverse square law that was previously depicted in FIG. 11 for the ratio of surface area to volume.

Figure 14:
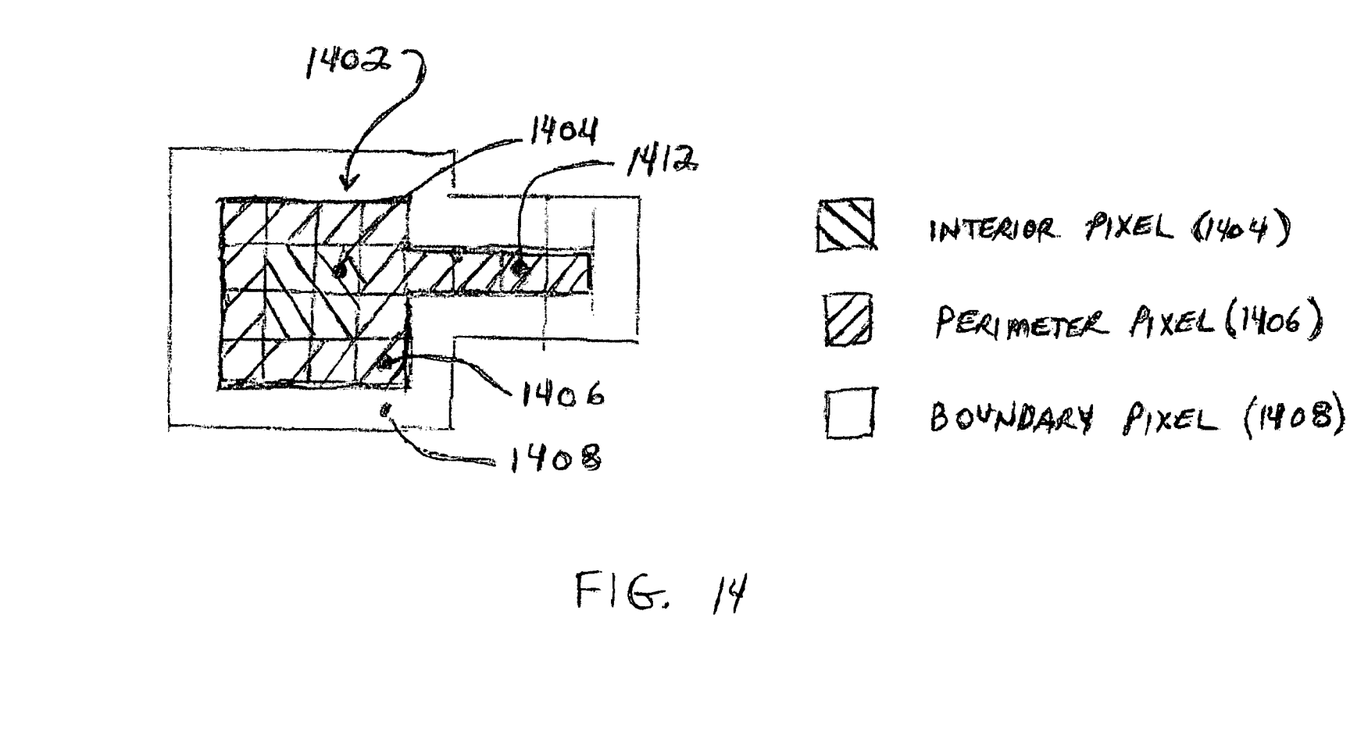
FIG. 14 depicts a small key-shaped region that is made up of a set of pixels in a CT image.

FIG. 14 depicts a small key-shaped region 1402 that is made up of a set of pixels in a CT image. Object 1402 is comprised of interior pixels 1404 and perimeter pixels 1406. Boundary pixels 1408 are pixels that are adjacent to perimeter pixels 1406 but are not part of the object. In general there will be more boundary pixels than perimeter pixels because of the finite size of the pixels. In FIG. 14, the narrowest part of the region is only one pixel wide, so some pixels such as pixel 1412 are bounded on both sides by boundary pixels. Therefore a count of the boundary pixels is a better measure of the length of the perimeter than is a count of perimeter pixels.

Interior, Perimeter, and Boundary pixels may be identified by selecting each of the pixels that are included in the CT region and examining each of its 8 neighbors. If all neighboring pixels are also in the region, then the selected pixel is an interior pixel. If one or more of the neighboring pixels is not included in the region, then the selected pixel is a perimeter pixel. Each of the neighboring pixels that is not included in the region is a boundary pixel. Each boundary pixel thus discovered is tagged as a boundary pixel so it is not counted multiple times, or so all boundary pixels may be examined after the identification process is complete. Note that this is equivalent to the flowchart of FIG. 12, except that it is reduced from three dimensions to two (leave out the Z) and examine 8 neighbors instead of 26.

Discounting the effect of resolution in the Z direction, formulae for correcting the CT number of each region can be constructed that is very similar to the formula for a 3-dimensional object. For example, Equation (6) is provided below:

$$CorrectedCT = AvgCt + C1*PR*ES \qquad \text{Equation (6)}$$

Where AvgCt=Average CT number of the region;
PR=ratio of the length of the perimeter to the area of the region;
ES=EdgeSlope=difference between average CT number of the perimeter and average CT number of the boundary and C1 is an experimentally derived coefficient.

The area of each region can also be corrected using Equation (7) or Equation (8) provided below:

$$CorrectedArea = OriginalArea + D1*PR \qquad \text{Equation (7)}$$

$$CorrectedArea = OriginalArea + D2*PR*ES \qquad \text{Equation (8)}$$

Other more complex formulae may be constructed using more terms and more coefficients.

Values for the coefficients C0, C1, . . . Cn and D0, D1, . . . Dn can be computed in manner similar to the method for coefficients A(0-$n$) and B(0-$n$) described previously. In various embodiments, the coefficients can be derived experimentally by imaging a set of objects of known CT Number and volume. The various quantities (at least 4 of volume, CT Number, surface area, surface CT, boundary Area, and Boundary CT) are measured. Least square fitting techniques can be used to compute the coefficients for the formula that is used.

After the corrected CT number for CT region has been computed, the corrected CT number and volume of the 3-dimensional object can be computed by combining all of the CT regions for example Equation (9) and Equation (10) is provided below:

$$CorrectedVolume = \sum_{i=1}^{n} (Ai*Ti) \qquad \text{Equation (9)}$$

$$CorrectedCT = \left( \sum_{i=1}^{n} (Ai*CTi) \right) \Big/ <CorrectedVolume> \qquad \text{Equation (10)}$$

for i=1,2, . . . <number of CT regions>, where $A_i$=Corrected area of region i, $T_i$=Thickness of corresponding CT slice, and $CT_i$=CorrectedCT of region i After the CT number and volume has been corrected for errors caused by spatial resolution in the x, y plane, a further correction can be applied to correct for errors caused by spatial resolution in the Z direction. This method is equivalent to the previously described methods for 2- and 3-dimensions.

The Z correction is accomplished by finding the surface area in the Z direction (the Z-surface area). A voxel belongs to the Z surface when the voxel is included in the object, and the adjacent voxel directly above or below it in the Z direction is not included in the object. A voxel belongs to the Z-boundary when the voxel is not included in the object, and the voxel directly above or below it in the Z direction is included in the object. The Z-SurfaceCT is the average CT number of the Z-surface voxels, and the Z-BoundaryCT is the average CT number of the Z-Boundary Voxels.

For sparse slicing systems it may not be possible to determine the complete Z-Surface, surface CT, or boundary CT because of missing data above and below each slice. The Z-surface area can be approximated by creating a projection of all of the slices in the Z direction, and finding the area of the projection. The Z-surface area is at least twice the area of the projection. The Z-Surface CT can be approximated by the CT numbers of the first CT regions, and the Z-Boundary CT can be approximated as K*Z-Surface CT, where K is a constant between zero and one.

Figure 15:
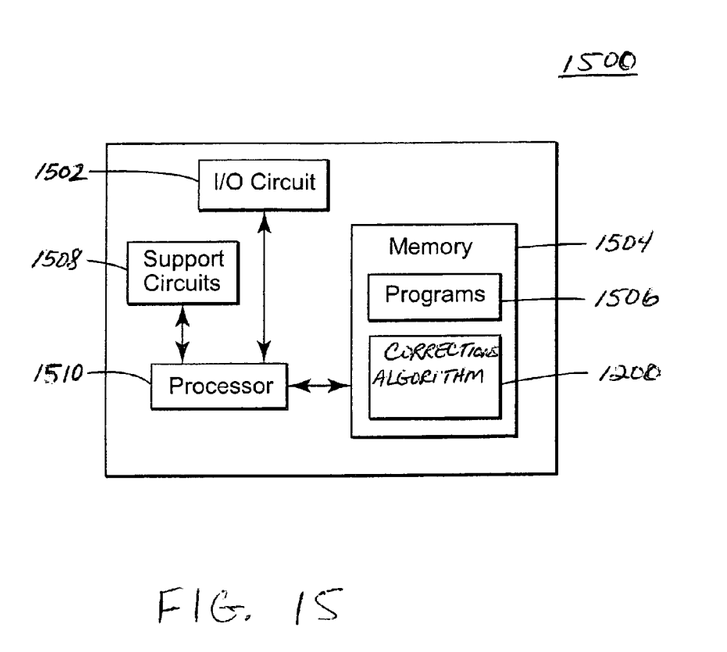
FIG. 15 depicts a high-level block diagram of a general-purpose computer architecture 1500 for performing an embodiment of the invention.

FIG. 15 depicts a high-level block diagram of a general-purpose computer architecture 1500 for performing an embodiment of the invention. For example, the general-purpose computer 1500 is suitable for use in performing the method of FIG. 12. The general-purpose computer of FIG. 15 includes a processor 1510 as well as a memory 1504 for storing control programs and the like. In various embodiments, memory 1504 also includes programs (e.g., depicted as CT Number and volume corrector 1512) for performing the method 1200. The processor 1510 cooperates with conventional support circuitry 1508 such as power supplies, clock circuits, cache memory and the like as well as circuits that assist in executing the software routines 1506 stored in the memory 1504. As such, it is contemplated that some of the process steps discussed herein as software processes may be loaded from a storage device (e.g., an optical drive, floppy drive, disk drive, etc.) and implemented within the memory 1504 and operated by the processor 1510. Thus, in various embodiments invention, can be stored on a computer readable medium. For example, any/all of the method 1200 can be stored on computer-readable media as a plurality of instructions which, when executed by a processor, cause the processor the processor to perform any step (or steps) indicated in the method 1200. The general-purpose computer 1500 also contains input-output circuitry 1502 that forms an interface between the various functional elements communicating with the general-purpose computer 1500.

Although FIG. 15 depicts a general-purpose computer 1500 that is programmed to perform various control functions in accordance with the present invention, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

This written description uses examples to disclose the invention, including the best mode, and also to enable any person skilled in the art to make and use the invention. Although specific features of various embodiments of the invention may be shown in some drawings and not in others, this is for convenience only. In accordance with the principles of the invention, each feature may be combined with any or all of the other features in any of the drawings. Further, the patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A method comprising:
computing an average computed tomography ("CT") value and volume of voxels that are part of an object; computing a ratio of a surface area to a volume for said object; computing a surface CT number and a boundary CT number for said object; and computing a corrected CT number and a corrected volume for said object; wherein said corrected CT number and said corrected volume are computed using at least four of said average CT value, said volume of voxels, said surface area, said surface CT number, a boundary area, and said boundary CT number.

2. A method comprising:
decomposing a computed tomography ("CT") volume into a set of 2-dimensional CT regions;
applying image based CT number and area corrections to each CT region in said set; and
combining a corrected CT number, a corrected area, and corresponding slice thickness of all of said CT regions to compute an x,y corrected CT number and corrected volume, wherein applying image based CT number and area corrections comprises:
computing an average computed tomography ("CT") value and area for each CT region;
computing a ratio of a length of a perimeter of said region to an area of said region;
computing an average CT number for perimeter pixels of said region and an average CT number of boundary pixels of said region; and
computing a corrected CT number and area with a formula using at least four of said average CT value, said area, said length of a perimeter, a number of perimeter pixels, said average CT number of perimeter pixels, a number of boundary pixels, and said average CT number of boundary pixels.

3. The method of claim 2, further comprising:
applying image based CT number and volume corrections in a third dimension to compute a final corrected CT number and a final corrected volume.

4. A non-transitory computer-readable medium having stored thereon a plurality of instructions, the plurality of instructions including instructions which, when executed by a processor, cause the processor to perform the steps comprising:
computing an average computed tomography ("CT") value and volume of voxels that are part of an object;
computing a ratio of a surface area to a volume for said object; computing a surface CT number and a boundary CT number for said object; and computing a corrected CT number and a corrected volume for said object; wherein said corrected CT number and said corrected volume are computed using at least four of said average CT value, said volume of voxels, said surface area, said surface CT number, a boundary area, and said boundary CT number.

5. A computer-readable medium having stored thereon a plurality of instructions, the plurality of instructions including instructions which, when executed by a processor, cause the processor to perform the steps comprising:
decomposing a computed tomography ("CT") volume into a set of 2-dimensional CT regions;
applying image based CT number and area corrections to each CT region in said set; and
combining a corrected CT number, a corrected volume, and a corresponding slice thickness of all of said CT regions to compute an x,y corrected CT number and corrected volume, wherein applying image based CT number and area corrections to each CT region comprises:
computing an average computed tomography ("CT") value and area for each CT region;
computing a ratio of a length of a perimeter of said region to an area of said region;
computing an average CT number for perimeter pixels of said region and an average CT number of boundary pixels of said region; and
computing a corrected CT number and area with a formula using at least four of said average CT value, said area, said length of a perimeter, a number of perimeter pixels, said average CT number of perimeter pixels, a number of boundary pixels, and said average CT number of boundary pixels.

6. The computer-readable medium of claim 5, further comprising applying image based CT number and volume corrections in a third dimension to compute a final corrected CT number and a final corrected volume.

* * * * *